United States Patent

Ahlert et al.

[11] Patent Number: 5,828,532
[45] Date of Patent: Oct. 27, 1998

[54] GETTER LAYER LEAD STRUCTURE FOR ELIMINATING RESISTANCE INCREASE PHENOMENA AND EMBRITTLEMENT AND METHOD FOR MAKING THE SAME

[75] Inventors: Richard H. Ahlert, San Jose; James K. Howard, Morgan Hill; Michael A. Parker, Fremont, all of Calif.

[73] Assignee: International Business Machines Corporation, Armonk, N.Y.

[21] Appl. No.: 941,774

[22] Filed: Sep. 30, 1997

Related U.S. Application Data

[63] Continuation of Ser. No. 738,973, Oct. 24, 1996, Pat. No. 5,680,282.

[51] Int. Cl.$^6$ .................................................. G11B 5/39
[52] U.S. Cl. ................................... 360/113; 360/126
[58] Field of Search ................................. 360/113, 125, 360/126; 324/252, 207.12; 338/32 R; 29/603.07, 603.13

[56] References Cited

U.S. PATENT DOCUMENTS

| | | | |
|---|---|---|---|
| 3,268,328 | 8/1966 | Torti, Jr. ................................... | 148/422 |
| 3,497,402 | 2/1970 | Douglass et al. ...................... | 148/668 |
| 4,914,538 | 4/1990 | Howard et al. ......................... | 360/113 |
| 5,011,742 | 4/1991 | Fife et al. .............................. | 428/558 |
| 5,171,379 | 12/1992 | Kumar et al. .......................... | 148/422 |
| 5,268,806 | 12/1993 | Goubau et al. ........................ | 360/113 |
| 5,302,461 | 4/1994 | Anthony ................................. | 428/472 |
| 5,327,313 | 7/1994 | Nishioka et al. ...................... | 360/113 |
| 5,458,908 | 10/1995 | Krounbi et al. ....................... | 427/123 |
| 5,467,881 | 11/1995 | Gill ........................................ | 216/22 |
| 5,473,492 | 12/1995 | Terunuma et al. .................... | 360/128 |
| 5,491,600 | 2/1996 | Chen et al. ............................ | 360/113 |
| 5,492,720 | 2/1996 | Gill et al. .............................. | 427/131 |
| 5,508,866 | 4/1996 | Gill et al. .............................. | 360/113 |
| 5,557,491 | 9/1996 | Gill et al. .............................. | 360/113 |
| 5,568,335 | 10/1996 | Fontana et al. ....................... | 360/113 |
| 5,588,199 | 12/1996 | Krounbi et al. ....................... | 29/603.1 |
| 5,638,235 | 6/1997 | Gill et al. .............................. | 360/113 |
| 5,666,246 | 9/1997 | Gill et al. .............................. | 360/113 |
| 5,668,685 | 9/1997 | Soeya et al. .......................... | 360/113 |
| 5,668,686 | 9/1997 | Shouji et al. ......................... | 360/113 |

FOREIGN PATENT DOCUMENTS 2-291185  11/1990  Japan.
7-114712  5/1995  Japan.

OTHER PUBLICATIONS

W–K. Chu and J. K. Howard, "Oxygen Gettering in Transition Metals for Stable Low Barrier Height Schottky Diodes", *IBM Technical Disclosure Bulletin*, vol. 21, No. 3, Aug. 1978, pp. 1054–1057.

*Primary Examiner*—Jefferson Evans
*Attorney, Agent, or Firm*—Merchant, Gould, Smith, Edell, Welter & Schmidt, P.A.

[57] ABSTRACT

A thin film lead structure resistant to resistance increase phenomenon resulting from contamination by mobile impurities. A thin film lead is disposed proximate to a getter layer material having a higher affinity for mobile impurities that the thin film lead. The getter layer material captures mobile impurities and prevents their migration into the thin film lead. The getter layer material may be formed over and in contact with the thin film lead, may be encapsulated within the thin film lead, or both. The getter layer material comprises a rare earth metal selected from the group consisting of yttrium, scandium, lanthanum, cerium, praseodymium, neodymium, samarium, gadolinium, terbium, dysprosium, holmium, erbium, and ytterbium. The thin film lead is preferably tantalum, but may be selected from the group consisting of niobium, vanadium, chromium, molybdenum, tungsten and iron. An alternate embodiment of the invention includes a transition metal comprising titanium, zirconium, or hafnium as the getter layer. The capture of mobile impurities by the getter layer prevents resistance increase phenomenon and embrittlement to the thin film lead. The thin film lead may be used as a thin film lead to an electrical circuit, the sensor structure in a magnetic head.

59 Claims, 12 Drawing Sheets

FIG. 5

| SAMPLE | BEFORE HUMIDITY EXPOSURE | DURING HUMIDITY EXPOSURE | AFTER HUMIDITY EXPOSURE |
|---|---|---|---|
| 3G/3G | 28.9 Å | 35.6 Å | 42.7 Å |
| 3G/8G | 29.1 Å | 34.9 Å | 41.4 Å |
| 3G/3-100 | 28.5 Å | 35.4 Å | 42.1 Å |
| 3G/3-50 | 29.6 Å | 35.3 Å | 41.5 Å |
| 8G/8G | 26.1 Å | 34.8 Å | 42.0 Å |
| 8G/8-50 | 26.4 Å | 34.8 Å | 41.8 Å |

|  |  | 25° C | 100° C |
|---|---|---|---|
| OXYGEN | DIFFUSIVITY | $4.1 \times 10^{-21}$ CM$^2$/S | $3.5 \times 10^{-18}$ CM$^2$/S |
|  | PERMEATION | $6.8 \times 10^{6}$ HOURS | $4.7 \times 10^{3}$ HOURS |
| HYDROGEN | DIFFUSIVITY | $2.0 \times 10^{-6}$ CM$^2$/S | $9.0 \times 10^{-6}$ CM$^2$/S |
|  | PERMEATION | $5.0 \times 10^{-5}$ SEC | $1.1 \times 10^{-5}$ SEC |
| Ogb | DIFFUSIVITY | $2.6 \times 10^{-14}$ CM$^2$/S | $3.1 \times 10^{-10}$ CM$^2$/S |
|  | PERMEATION | 64 MIN | 0.3 SEC |

FIG. 6

TANALUM LEAD WITH HYDROGEN AND OXYGEN IMPURITIES

TANTALUM LEAD WITH YTTRIUM (OR OTHER) GETTER LAYER

FIG. 11

| ID | STRUCTURE | RELATIVE RESISTANCE INCREASE | INITIAL EFFECTIVE RESISTIVITY μΩ·cm |
|---|---|---|---|
| 20 | Ta(50Å)/Ti(20Å)/Ta(950Å)/WTi(100Å) | 16.2± 3.0% | 37.4± 0.1 |
| 21 | Ta(500Å)/Ti(10Å)/Ta(500Å)/WTi(100Å) | 20.7± 0.4% | 36.1± 0.2 |
| 22 | Ta(500Å)/Ti(20Å)/Ta(500Å)/WTi(100Å) | 18.9± 1.0% | 34.0± 0.2 |
| 23 | Ta(500Å)/Ti(50Å)/Ta(500Å)/WTi(100Å) | 3.3 ±0.3% | 35.1± 0.1 |
| 24 | Ta(1000Å)/WTi(100Å) | 19.2± 0.7% | 28.3± 0.1 |
| 25 | Ta(900Å)/WTi(100Å) | 18.7± 0.2% | 28.7± 0.1 |
| 26 | Ta(500Å)/Y(20Å)/Ta(950Å)WTi(100Å) | 10.3± 0.1% | 29.2± 0.1 |
| 27 | Ta(500Å)/Y(50Å)/Ta(950Å)WTi(100Å) | 16.3± 1.5% | 28.5± 0.1 |
| 28 | Ta(500Å)/Y(10Å)/Ta(500Å)WTi(100Å) | 17.8± 2.5% | 35.2± 0.1 |
| 29 | Ta(500Å)/Y(20Å)/Ta(500Å)WTi(100Å) | 2.1 ±0.9% | 58.1± 0.2 |
| 30 | Ta(50Å)/Zr(25Å)/Ta(950Å)WTi(100Å) | 20.9± 1.0% | 26.9± 0.1 |
| 31 | Ta(50Å)/Zr(50Å)/Ta(950Å)WTi(100Å) | 13.3± 1.8% | 26.9± 0.1 |
| 32 | Ta(50Å)/Mg(50Å)/Ta(950Å)WTi(100Å) | 15.6± 0.2% | 27.6± 0.1 |
| 33 | Ta(500Å)/Mg(50Å)/Ta(500Å)WTi(100Å) | 9.6 ±1.0% | 26.3± 0.1 |

GETTER LAYER LEAD STRUCTURE FOR ELIMINATING RESISTANCE INCREASE PHENOMENA AND EMBRITTLEMENT AND METHOD FOR MAKING THE SAME

This is a Continuation of application Ser. No. 08/738,973, filed Oct. 24, 1996, now U.S. Pat. No. 5,680,282; which application(s) are incorporated herein by reference.

BACKGROUND OF THE INVENTION

1. Field Of The Invention.

This invention relates in general to controlling mobile impurities in leads for a magneto-resistive transducer in a magnetic storage device, and more particularly, to a getter layer lead structure in the magneto-resistive head for eliminating resistance increase phenomena and embrittlement in magnetic heads and method for making the same.

2. Description of Related Art.

Magnetic recording heads that employ magneto-resistive (MR) sensors or circuits exhibit reliability problems called resistance increase phenomena. These problems manifest themselves in high humidity environments as a monotonically increasing change in the resistance of the MR circuit.

Many mechanisms have been identified as a possible cause for these resistance increases. One mechanism that has been implicated involves changes in the resistivity of the lead metallurgy that makes contact to the sensor and provides for continuity of current flow to the external contact pads of the MR circuit on the head. The resistivity of these leads often constitutes more than 50% of the series resistance of the circuit so that changes in the resistivity of the lead metallurgy have a significant influence on the conductance of the circuit and its ability to maintain stable operation within the specification window of external interface electronics. There is evidence that these resistance increase phenomena may be associated more with resistivity changes within the lead material itself, or with changes in the contact resistance between the lead and other metallurgies in the head that result from cracking or delamination at the interface between the two.

Resistance increase phenomena may be differentiated based on how fast the conductance of the circuit degrades, and may have in varying degree contributions from either resistivity changes within the lead or delamination/cracking at lead contacts. In addition, resistance increase phenomena depend on the exposure of the head to air and water vapor in high humidity environments. Indeed, one type of resistance increase phenomenon, "resistance creep", has even been observed in test monitors of the lead metallurgy just on exposure to ambient air, which depending on the relative humidity contains varying amounts of water vapor.

Tantalum possesses properties which make it desirable to use as a lead, e.g., its hardness. These advantages make the use of alternative lead materials less desirable.

However, tantalum lead metallurgy employed in MR heads is known to be susceptible to the effects of resistance increase phenomena discussed above. As with other body centered cubic (BCC) metals, tantalum will increase resistivity as a function of increasing oxygen and hydrogen content. Furthermore, tantalum, as well as other body centered cubic metals, is readily embrittled by hydrogen, but less severely so, by oxygen impurities. Such embrittlement may contribute to delamination in the lead metallurgy.

Methods for controlling the deleterious effects of hydrogen in tantalum comes principally from general metallurgical research, since this impurity is a severe embrittler of all body centered cubic metals, i.e. it significantly reduces the fracture strength and ductility of body centered cubic metals, like tantalum. However, most of the literature regarding the effects of oxygen on tantalum has been related to the use of tantalum as resistors in electronics for communications applications.

Work has been done on the cause and nature of resistance increase phenomena in the MR head after exposure to a high humidity environment. More specifically, extensive analysis of heads has been performed in attempts to solve the resistance increase problem in tantalum leads. Quantitative measurements of the oxide thickness through electron spectroscopy for chemical analysis (ESCA) coupled with experimental results on the effect of sputter etching in causing tantalum thin films to revert to their pre-humidity-exposure values of sheet resistance suggests that the release of a mobile species might be responsible for the resistance increase phenomenon. Mobile hydrogen species in the thin film leads have been confirmed through forward recoil detection (FRD).

It can be seen then that there is a need for tantalum leads that do not exhibit resistance increase phenomena.

It can also be seen that there is a need for a method of producing tantalum leads that are not susceptible to resistance increase phenomena.

SUMMARY OF THE INVENTION

To overcome the limitations in the prior art described above, and to overcome other limitations that will become apparent upon reading and understanding the present specification, the present invention discloses a thin film lead structure resistant to resistance increase phenomena resulting from contamination by mobile impurities.

The present invention solves the above-described problems by providing a getter layer material having a higher affinity for mobile impurities such that the mobile impurities are captured by the getter layer.

A system in accordance with the principles of the present invention includes a thin film lead and a getter layer material, disposed proximate to the thin film lead. The getter layer has a higher affinity for mobile impurities that of the thin film lead. Thus, the getter layer material captures mobile impurities and prevents their migration into the thin film lead.

One aspect of the present invention is that the getter layer material is formed over and in contact with the thin film lead.

Another aspect of the present invention is that the getter layer material is encapsulated within the thin film lead.

Another aspect of the present invention is that the getter layer material comprises a rare earth metal.

Another aspect of the present invention is that the rare earth metal is selected from the group consisting of yttrium, scandium, lanthanum, cerium, praseodymium, neodymium, samarium, gadolinium, terbium, dysprosium, holmium, erbium, and ytterbium.

Another aspect of the present invention is that the thin film lead comprises tantalum.

Yet another aspect of the present invention is that the thin film lead comprises body centered cubic transition metals, the body centered cubic transition metals selected from the group consisting of tantalum, niobium, vanadium, chromium, molybdenum, tungsten and iron.

Another aspect of the present invention is that the thin film lead comprises body centered cubic alloys.

Another aspect of the present invention is that the getter layer comprises a transition metal comprising titanium, zirconium, or hafnium.

Another aspect of the present invention is that the getter layer captures mobile impurities at temperatures between 25° C. and 240° C.

Another aspect of the present invention is that the capture of mobile impurities by the getter layer prevents resistance increase phenomenon and embrittlement to the thin film lead.

Still another aspect of the present invention is that getter layer material comprises a multi-layer construction, the multi-layer construction comprising at least a first getter layer formed over and in contact with the thin film lead and at least a second getter layer encapsulated within the thin film lead.

Another aspect of the present invention is that the thin film lead comprises a thin film lead to an electrical circuit.

Another aspect of the present invention is that the thin film lead comprises a thin film lead formed at an air bearing surface on a slider for a data storage device.

Another aspect of the present invention is that the thin film lead comprises a thin film lead buried below an air bearing surface on a slider for a data storage device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 illustrates a table that shows the results of ESCA analysis of the thickness of the surface oxides on the thin films before, after, and during a humidity exposure test for a thin film without a getter layer according to the present invention;

FIG. 6 illustrates a second table that shows diffusivity data and calculated values of the corresponding thin film permeation times for oxygen and hydrogen in tantalum (for a 1000A film) at room temperature and at 100° C.;

FIG. 11 is a chart illustrating resistance data for several thin film structures according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a getter layer in contact with or within a thin film lead for a magnetic head to protect the lead from the deleterious effects of mobile impurities, such as oxygen or hydrogen. Such deleterious effects for which it imparts protection include "resistance creep", or resistance increase phenomena and embrittlement. However, those skilled in the art may find applications in other situations where such impurities have other deleterious effects, such as corrosion, electromigration, or contact resistance stability, or where other mobile impurities, such as carbon or nitrogen, are present.

The getter layer works by scavenging these impurities from the thin film lead due to its enhanced affinity for these impurities relative to the thin film lead itself at ambient, and near ambient temperatures as a result of their encountering the getter layer during the normal migration of these impurities through the structure. Nevertheless, the present invention may also find applications during processing at elevated temperatures, when it is desirable to trap a deleterious mobile impurity that may have adverse effects on the function of a thin film lead.

Figure 1:
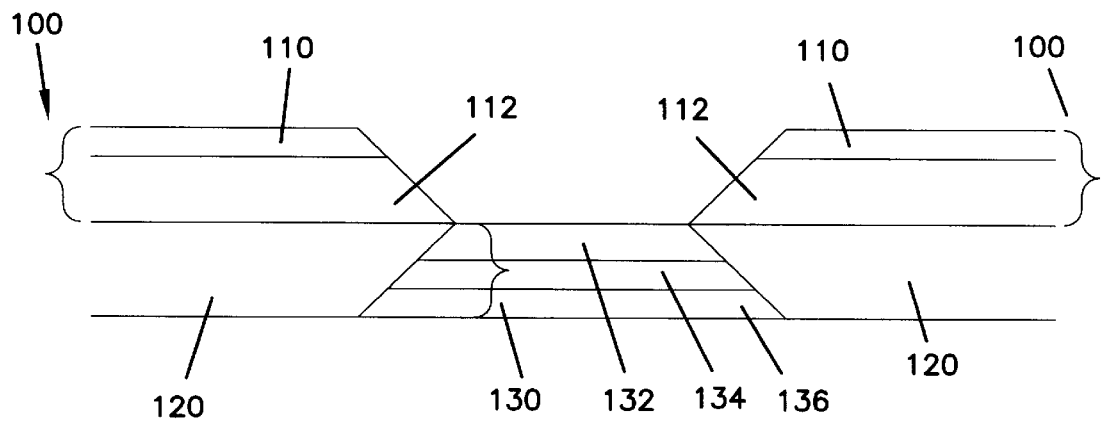
FIG. 1 illustrates a magneto-resistive sensor having a getter layer lead according to the present invention.

FIG. 1 illustrates a magneto-resistive sensor having a getter layer lead structure 100 in contact with hard bias layers 120 according to the present invention. A getter layer 110 is shown in contact with the top of the lead metallurgy 112. The getter layer lead structure lies on top of a hard bias layer 120 or other suitable biasing layer which may also consist of an exchange bias structure which are in intimate contact with the MR sensor element 130 including the magneto-resistive layer 132, the spacer layer 134, and the soft adjacent layer 136. The getter layer 110 serves to scavenge deleterious impurities from the lead proper 112, and to preclude impurities from either embrittling or increasing the resistivity of the lead 112.

Figure 2:
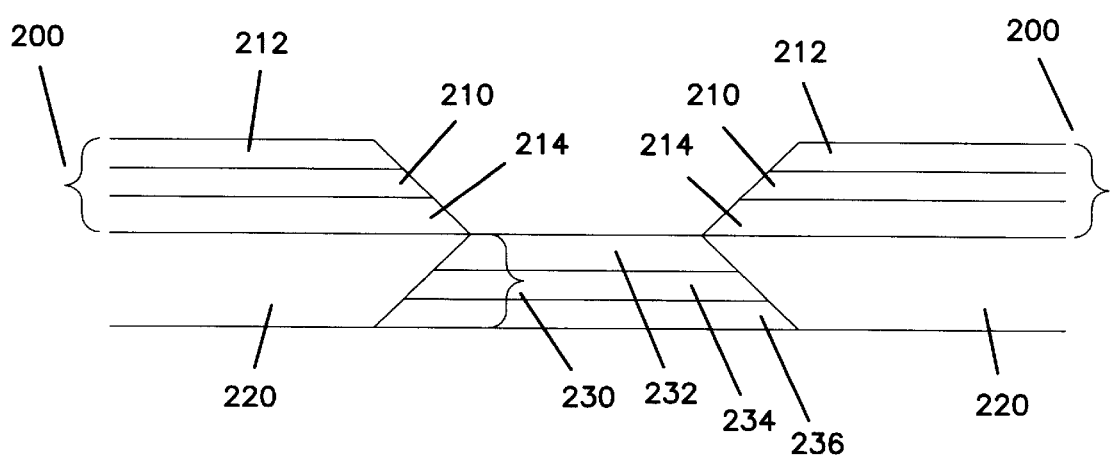
FIG. 2 illustrates an alternative magneto-resistive sensor having a getter layer lead according to the present invention.

FIG. 2 illustrates an alternative magneto-resistive sensor having a getter layer lead structure 200 according to the present invention. A getter layer 210 is incorporated or encapsulated within a first 212 and second 214 portion of the lead metallurgy as illustrated in FIG. 2. The getter layer lead structures lies on top of a hard bias layer or other suitable bias layer such as an exchange bias structure 220 which is in intimate contact with the MR sensor element 230, which includes the magneto-resistive layer 232, the spacer layer 234, and the soft adjacent layer 236. Those skilled in the art will recognize that a combination of the getter layer 110, 210 as illustrated in FIG. 1–2 may be used to create a multi-layered structure. Furthermore, those skilled in the art will recognize that the invention is not meant to be limited to the sensor structures discussed above. Other sensors, such as spin valve magneto-resistive sensors, may employ a getter layer according to the present invention to protect leads from the deleterious effects of mobile impurities.

As shown in FIGS. 1 and 2, for example, the getter layer 110, 210 is characterized by having a greater affinity for deleterious impurities, e.g. oxygen or hydrogen, than the lead material 112, 212, 214. Tantalum, which is a body centered cubic transition metal, is embrittled by hydrogen and oxygen, and the resistivity is increased by the addition of these impurities. However, a rare earth (RE) metal such as yttrium and more generally other rare earth metals, e.g. scandium (Sc), lanthanum (La), cerium (Ce), praseodymium (Pr), neodymium (Nd), samarium (Sm), gadolinium (Gd), terbium (Tb), dysprosium (Dy), holmium (Ho), erbium (Er), and ytterbium (Yb), serve as suitable getter materials 110, 210. Also, more generally, in the case of other body centered cubic transition metals that might be used in lead metallurgy systems, either as leads 112, 212, 214 themselves, or contact or adhesion layers, such as vanadium (V), chromium (Cr), niobium (Nb), molybdenum (Mo), tungsten (W) and iron (Fe), and body centered cubic transition metals which are embrittled by hydrogen and oxygen, and whose resistivity is increased by the addition of these impurities, a rare earth metal such as yttrium or the other mentioned rare earth metals serve as a suitable getter material 110, 210.

In the case of tantalum, other transition metals with greater affinity for deleterious impurities, such as oxygen and hydrogen which are normally hexagonal at room temperature, e.g. titanium (Ti), zirconium (Zr), or hafnium (Hf), might be used as getter material 110, 210 instead of the more costly rare earth metals. Similar considerations apply to body centered cubic transitional metals, in which case another body centered cubic transitional metal with greater affinity for these deleterious impurities would be matched to the specific metal used. Furthermore, another advantage of using body centered cubic transitional metals for getter material 110, 210, instead of the hexagonal rare earth metals, is the possibility of maintaining epitaxial registry between the various layers when the getter layer 110, 210 is incorporated or encapsulated within the lead 112, 212, 214. This is particularly important for tantalum which can be induced to change phase to the higher resistivity beta phase when deposited on top of yttrium. Titanium is preferred for a getter layer 210 when incorporated or encapsulated within the lead 212, 214. Still, it may be possible to induce the higher temperature body centered cubic phase of many of the rare earth metals or the hexagonal transition metals, titanium (Ti), zirconium (Zr) or hafnium (Hf) as a metastable phase by depositing on body centered cubic tantalum under certain conditions with the resulting benefits of a body centered cubic interlayer.

IBM Technical Disclosure Bulletin, Vol. 21, No. 3, August 1978, pp. 1054–1057, entitled "OXYGEN GETTERING IN TRANSITION METALS FOR STABLE LOW BARRIER HEIGHT SCHOTTKY DIODES", incorporated by reference herein, discloses the use of getter layers in tantalum leads to stabilize Schottky barriers from the deleterious effects of oxygen. Nevertheless, this present invention is distinguishable. For example, IBM Technical Disclosure Bulletin addressed the problem of oxide formation at the diode interface between the tantalum and silicon substrate under conditions where oxygen is extremely mobile, i.e., 500° C. and above. However, the present invention uses a getter layer 110, 210 which captures impurities at low temperatures between 25° C. and 240° C., which are the conditions where the resistance increase phenomenon is a problem, and where the mobility and the concentration of oxygen are substantially lower. The present invention also addresses the deleterious effects of hydrogen in the tantalum lead 112, 212, 214, on the lead resistivity, and fracture toughness.

The presence of hydrogen in the lead 112, 212, 214 is a problem which was heretofore unrecognized. The conventional approach to the metallurgical control of hydrogen and oxygen in tantalum by the addition of zirconium (Zr), titanium (Ti), or hafnium (Hf) as solute additions would also lead to unacceptable increases in the resistivity of the lead 112, 212, 214 due to these solute additions acting as impurity centers in their own right for electron scattering. Thus, the use of a getter layer 110, 210 to capture hydrogen for the purpose of stabilizing the resistivity and de-embrittling the tantalum lead 112, 212, 214 has not been performed before. The approach of using a getter layer 110, 210 also distinguishes itself from other approaches based on impeding the transport of oxygen or hydrogen into the film lead based on the use of diffusion barriers, whose implementation would require complete encapsulation of the lead, which is an impossibly difficult solution.

Adding a getter layer 110, 210 in combination with the tantalum lead 112, 212, 214 also distinguishes itself from approaches based on reducing the capacity of the lead 112, 212, 214 to absorb oxygen based on reducing the adsorption sites for oxygen within the lead such as grain boundaries (GBs). For example, absorption sites may be reduced by sputtering the lead material 112, 212, 214 under conditions which increase its grain size or density. This procedure only minimize the effects of oxygen, but can never really eliminate oxygen from the lead 112, 212, 214 as does the getter layer 110, 210. In addition, such approaches based on reducing the grain boundary area or defect density can not address the problem of hydrogen in the lead 112, 212, 214. This is because hydrogen is highly mobile and can easily reside at interstitial sites within the interior of grains. For these reasons, the use of a getter layer 110, 210 provides a more reliable, and more effective way of controlling the effect of these impurities than other approaches used thus far, by actually capturing the impurities, and trapping them away from the lead material 112, 212, 214.

Figure 3:
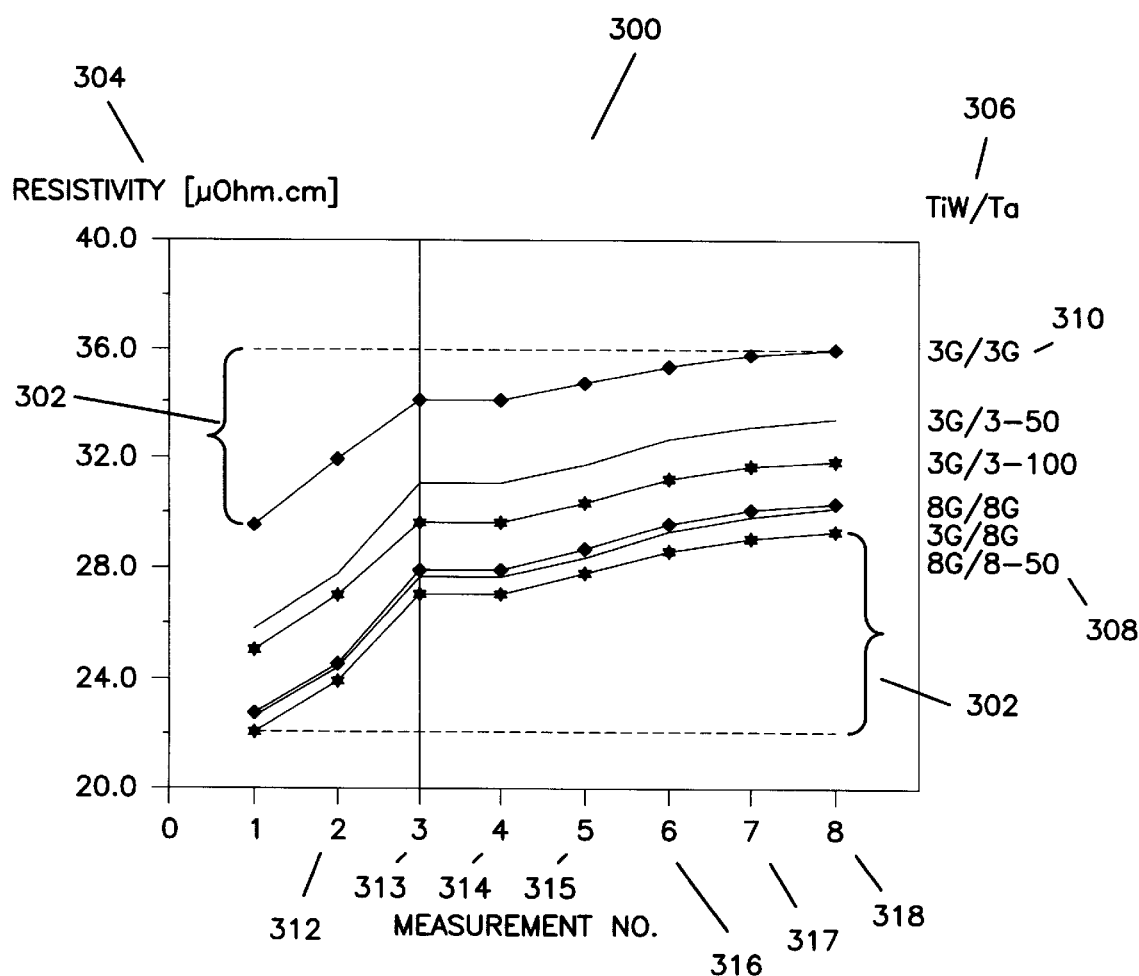
FIG. 3 illustrates a graph of the characteristic resistance increase phenomenon behavior observed during a total of 700 hours of humidity exposure test for test films without a getter layer according to the present invention.

FIG. 3 illustrates a graph 300 of the characteristic resistance increase phenomenon behavior, observed during a total of 700 hours of a humidity exposure test, for several test films of the lead material prepared under various sputtering conditions. FIG. 3 illustrates that the relative increases 302 in resistivity 304 are a function of the density of the thin film structure 306. Thin films sputtered at higher pressure 308, possess a more porous structure, and therefore show a greater percentage resistivity increase than thin films sputtered at a lower pressure 310. Also, note that nearly the biggest increase 312 in resistivity 304 occurs just on exposure of the thin films to ambient air after their preparation. The resistivity increases after subsequent humidity exposure tests are given by 313, 315, 316, 317 and 318, respectively. A negligible resistivity increase 314 results from a second extended exposure to ambient air after the first humidity exposure test. However, by a month's time, this "resistivity creep" effect is fully saturated and very little further change in resistivity 304 occurs. A comparison of the microstructure of the thin films before and after a total of 700 hours of humidity exposure tests illustrates that oxide precipitates at grain boundaries are clearly not evident.

Figure 4:
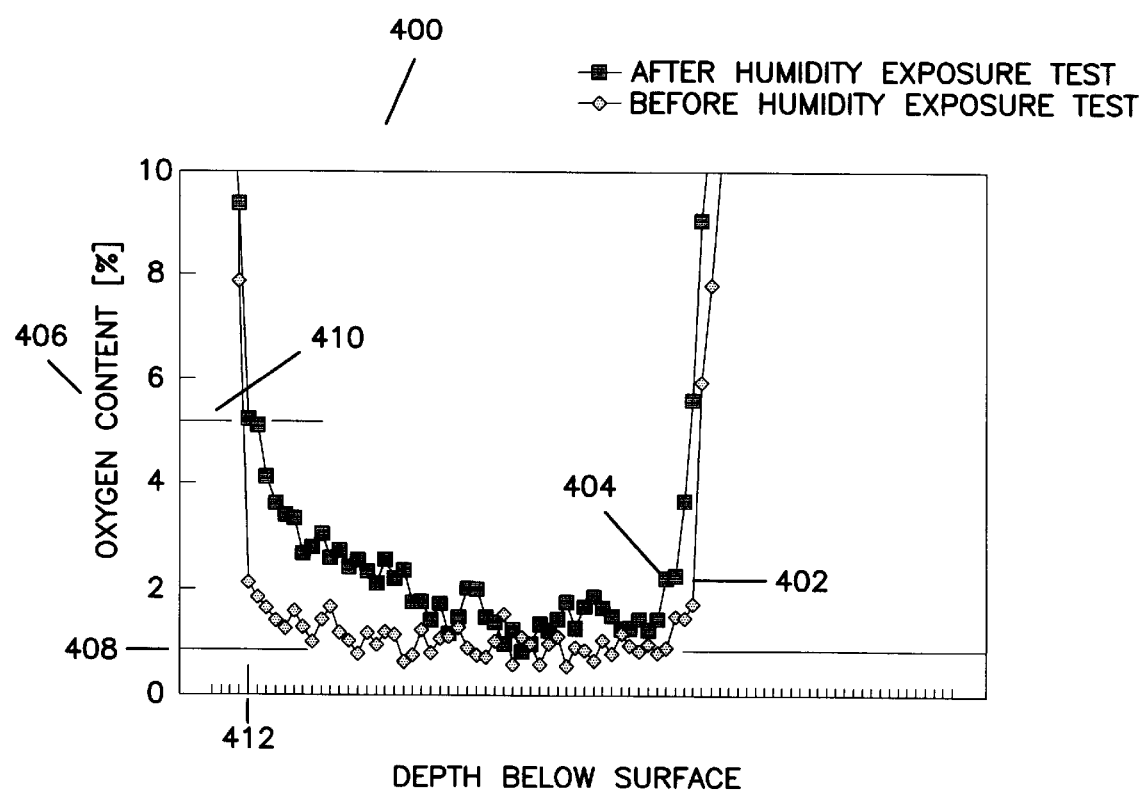
FIG. 4 shows an electron spectroscopy for chemical analysis (ESCA) depth profile comparing the oxygen concentration in the thin films before and after a humidity exposure test for a thin film without a getter layer according to the present invention.

FIG. 4 shows an electron spectroscopy for chemicals analysis (ESCA) depth profile 400 comparing the oxygen concentration in test films of the lead material before 402 and after 404 the humidity exposure test. The oxygen concentration 406 in the test film of the lead material before 402 testing is at the delectability limit 408; whereas in the test film exposed to humidity sample 404, the oxygen concentration 406 reaches a maximum of approximately 5% 410 near the surface 412, but drops rapidly to the delectability limit 408 within a few hundred Angstroms of the surface.

FIG. 5 illustrates a table 500 that shows the results of ESCA analysis of the thickness 502 (in Angstroms) of the surface oxides on the thin films before 504, after 506, and during a humidity exposure test after the first 100 hour exposure case 314 in FIG. 3. The observed resistance changes 510 in test films of the lead material can not be attributed to a reduction of the film thickness, but are in fact due to true resistivity increases of the tantalum film lead during the humidity exposure test.

In some experiments, sputter etching the test thin film led to a recovery of the initial resistance 504 of the test thin film. This was initially attributed to the effect of a thicker oxide after the humidity exposure test on 4-point probe measurements of the sheet resistance. However, the subsequent sheet resistance measurements were made by the eddy current probe technique which is impervious to any possible contact resistance problems encountered by a 4 -point probe. Further, ESCA data indicated that the oxide has negligibly increased from 28.9 Angstroms 512 before humidity exposure 504 to 42.7 Angstroms 514 after humidity exposure 506 for test films with a total tantalum thickness of 1000 Å. Thus, a mobile species responsible for impurity scattering was being released from the test film during the sputter etch. Since oxygen and hydrogen are both present during the humidity exposure test, hydrogen was believed to be playing a role in the resistance increase phenomenon because it is extremely mobile in body centered cubic metals.

FIG. 6 illustrates a second table that shows data regarding the rate of diffusion 602 for mobile impurities and calculated values of the corresponding thin film permeation times 604, 614, 624 for oxygen and hydrogen in tantalum (for a 1000A film) at room temperature 606 and at 100° C. 608. The values for the grain boundary diffusivity of oxygen 610 are the least reliable, because they had to be extrapolated to the lower temperatures 606 from high temperature data 608. As can be seen from the bulk diffusivity values only, hydrogen is mobile enough to explain the rapid recovery of sheet resistance after sputter etching tantalum test films that were earlier subjected to humidity exposure. Calculations of the grain boundary diffusivity 610 of oxygen indicate that at 100° C. 608, oxygen may be mobile enough to permeate the test thin film, but that at 25° C. 606, oxygen it is too slow to explain the rapid recovery of sheet resistance observed after sputter etching the test films. The recovery of sheet resistance occurred within the tens of seconds required to lightly sputter etch the surface of the test films sufficiently to remove the surface oxide.

Figure 7:
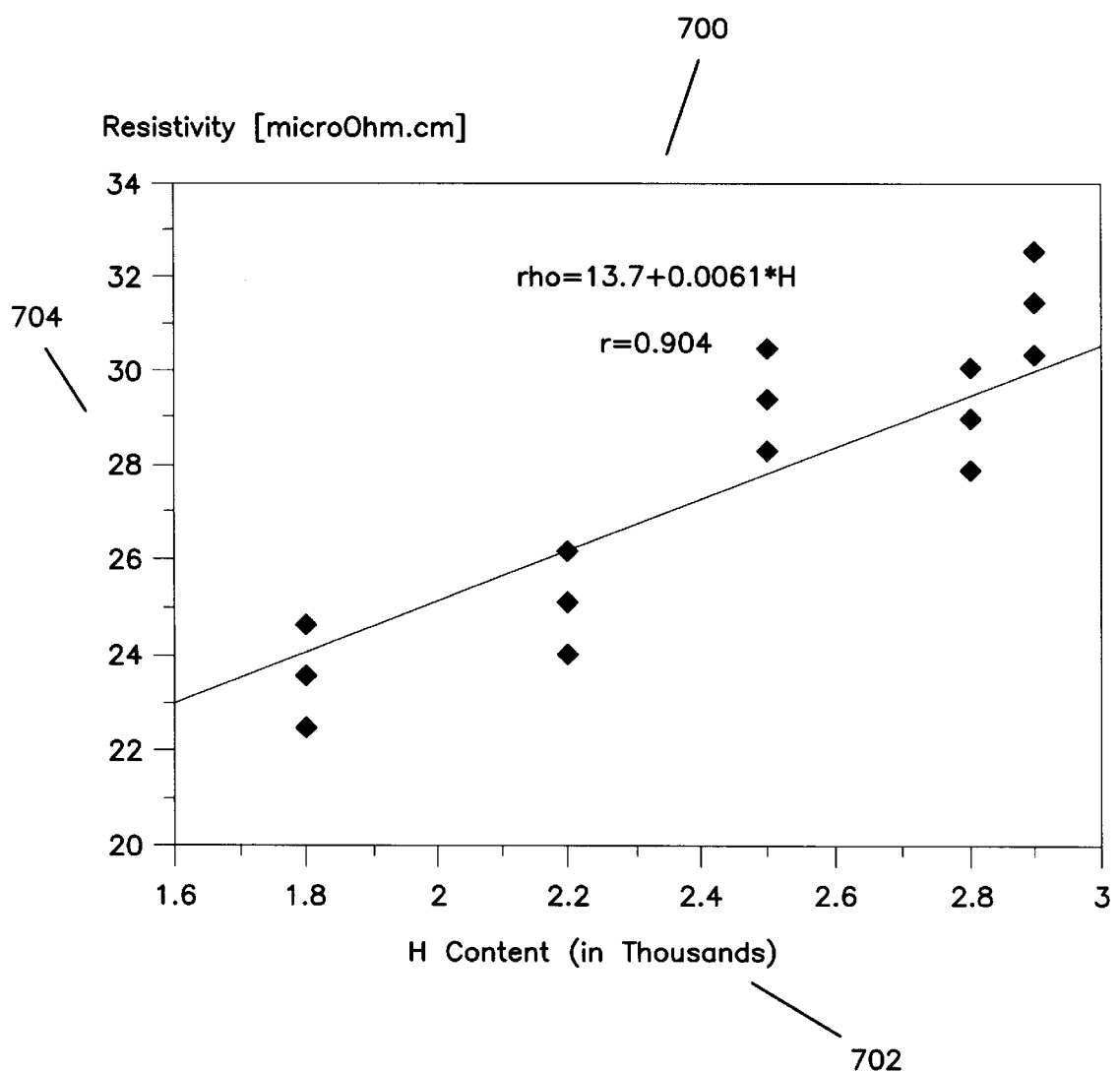
FIG. 7 shows a plot of hydrogen content vs. resistivity in tantalum.

Hydrogen playing a role in the resistance increase phenomenon was tested by analyzing the various test films subjected to the humidity exposure test by forward recoil detection (FRD) analysis. FIG. 7 shows a plot 700 of hydrogen content as measured in thousands of counts corresponding to scattering events 702 vs. resistivity 704. A positive correlation is evident between the hydrogen content 702 in these test films and their resistivity 704.

Having established that both hydrogen and oxygen were associated with the resistance increase phenomenon, samples were fabricated with getter layers in an attempt to trap any mobile species responsible for the resistance increase during the humidity exposure test.

Figure 8:
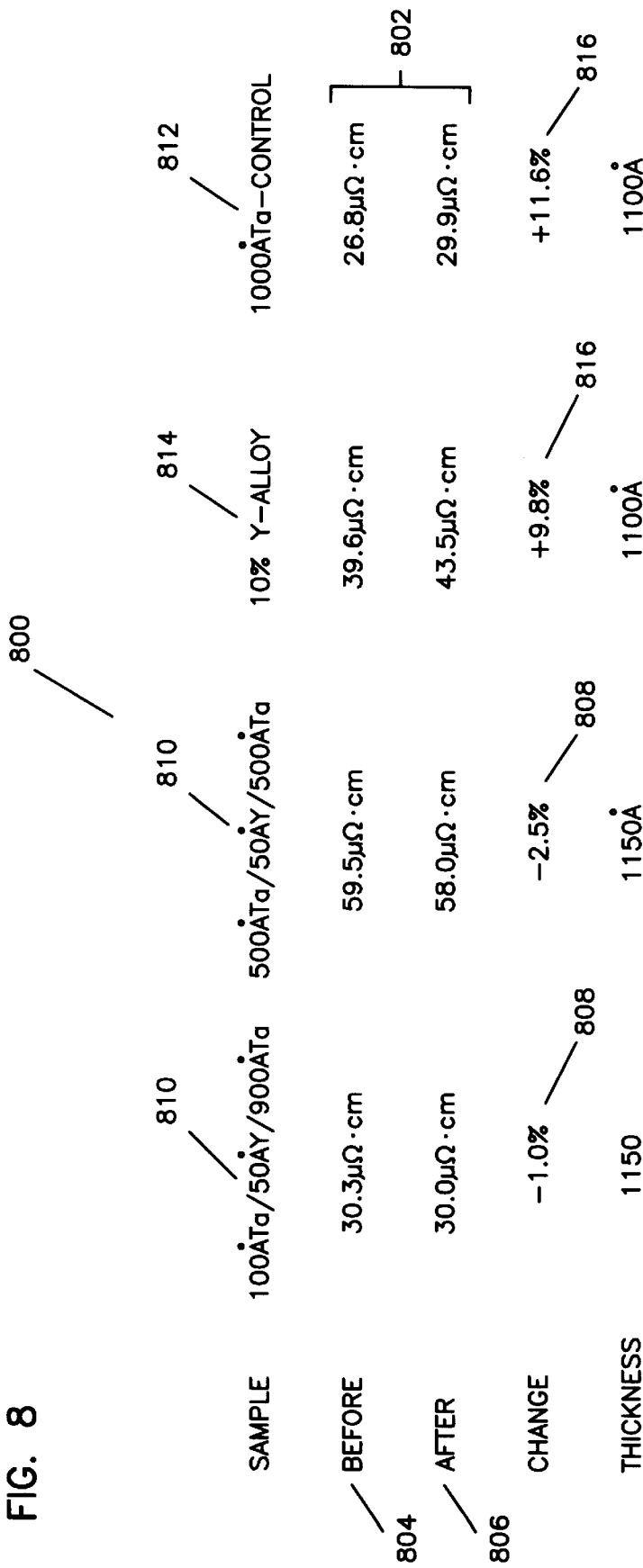
FIG. 8 illustrates a table that shows the results of resistivity measurements made on tantalum thin films before and after a humidity exposure test.

FIG. 8 illustrates a table 800 that shows the results of resistivity measurements 802 made on these test films before 804 and after 806 a humidity exposure test. The resistivity (in $\mu\Omega$-cm) of the test films actually decreased 808 after 806 the humidity exposure test in the test films which had getter layers 810, whereas the tantalum control samples 812 and the co-sputtered tantalum/yttrium alloy 814 showed a significant increase 816 in resistivity.

Figure 9:
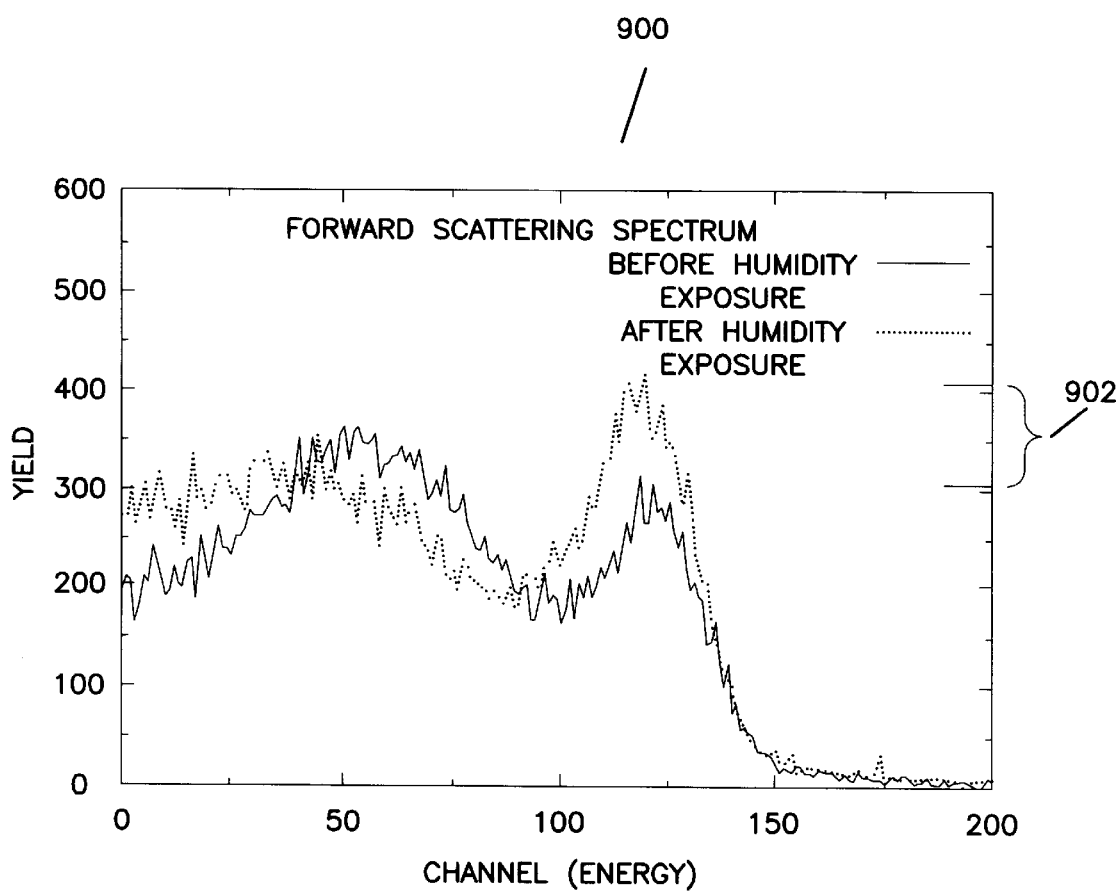
FIG. 9 shows an forward recoil detection scan of the tantalum thin film with a 50 Angstrom getter layer near the top surface of a tantalum composite film.

FIG. 9 shows a forward recoil detection scan 900 of a thin film with a 50 Angstrom yttrium getter layer near the top surface of a tantalum composite film. The increased height 902 of the surface scattering peak clearly demonstrates that hydrogen has been entrapped in the yttrium layer near the surface of the test thin film after the humidity exposure test.

Figure 10A:
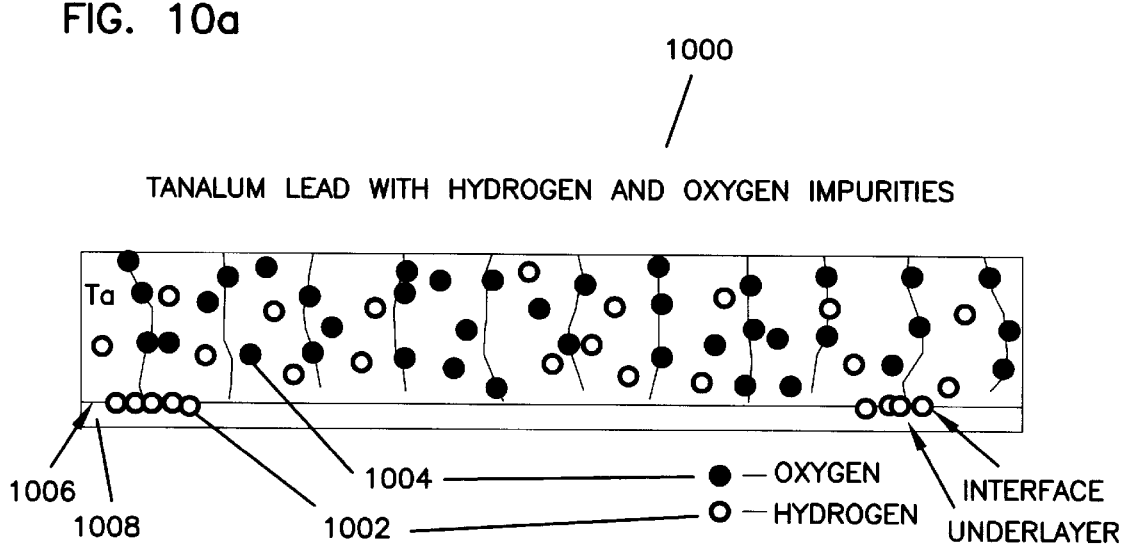
FIG. 10a illustrates a tantalum lead without a getter layer according to the prior art and the effect of mobile impurities thereon.

FIG. 10a illustrates a tantalum lead 1000 without a getter layer as in the prior art. In the tantalum lead 1000, hydrogen 1002 and oxygen 1004 impurities are present. These impurities 1002, 1004 cause increased resistivity and may contribute to delaminations 1006 between the lead 1000 and underlayers 1008 or overlayers in contact with the lead.

Figure 10B:
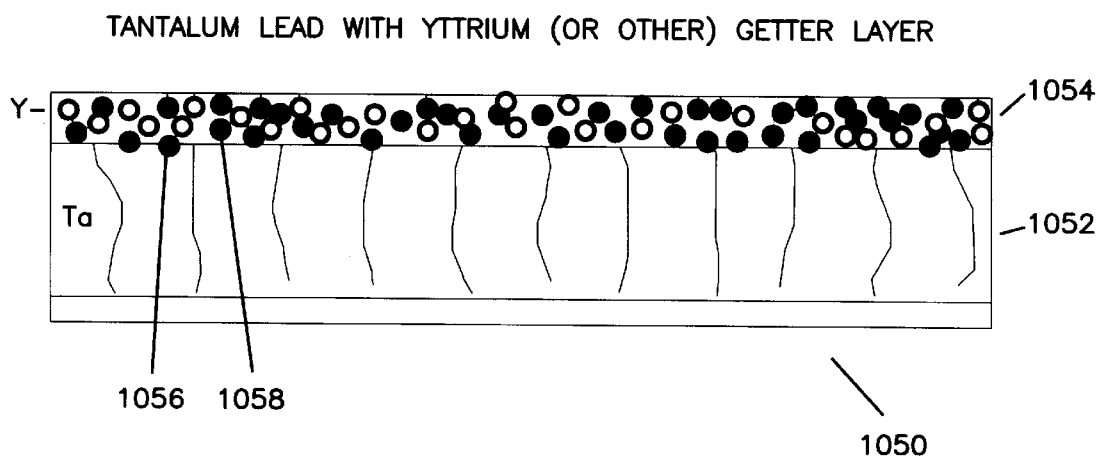
FIG. 10b illustrates a lead including a tantalum lead portion with a getter layer according to the present invention and the effects of mobile impurities thereon.

FIG. 10b illustrates a lead 1050 according to the present invention that includes a tantalum lead portion 1052 with a getter layer 1054, e.g. yttrium. The getter layer 1054 traps and removes the oxygen 1056 and hydrogen 1058 impurities from the lead 1052. The getter layer 1054 works independently of the lead microstructure. Hydrogen 1058 is trapped without alloying. Furthermore, the getter layer 1054 works passively at low temperatures, e.g. ambient (25° C.), all the way up to 240° C.

FIG. 11 shows data 1100 related to a preferred embodiment of the invention. It shows the results of resistance measurements after humidity exposure tests 1102 of several thin film structures for various embodiments 1104 of the invention. Structures 24 1110 and 25 1120 were control films consisting only of tantalum which showed resistance increases on the order of 19% 1130. In order for the getter layer to confer the desired benefit, the getter layer must be of sufficient thickness to provide an adequate sink for the mobile impurities. Note that films containing thicker getter layers 1140 in general confer greater protection against the deleterious effects of impurities, i.e., less relative resistance increase. Also, films in which the getter layer was capped by thicker layers of tantalum 1140 show less resistance increase than those with thinner caps 1150.

The preferred embodiment employs the getter layer in proximity to the top surface or on top of the tantalum lead, because when tantalum is deposited on most body centered cubic metals with a high affinity for oxygen, the tantalum reverts to the high resistivity beta-tantalum phase. Since it is desirable to keep the lead resistance as low as possible, depositing the getter layer on top of alpha-tantalum precludes the formation of the higher resistivity tantalum phase.

An alternative embodiment incorporates a getter layer within the lead material that only moderately increases the net resistivity of the lead as in case 23 for titanium (Ti) 1140 or decreases the net resistivity due to its lower bulk resistivity as in case 33 for magnesium (Mg) 1160 where the net lead resistivity is 35.1 $\mu\Omega$-cm and 26.3 $\mu\Omega$-cm compared to 28.3 $\mu\Omega$-cm for tantalum. In the case of titanium, it is believed that tantalum induces the pseudo-morphic growth of the high temperature body centered cubic phase of titanium as a metastable phase which in turn would lead to psuedo-morphic growth of the alpha-tantalum, low resistivity body centered cubic phase, on top of the titanium. It may also be possible to induce the formation of the high temperature body centered cubic phase of yttrium (Y) and zirconium (Zr) on tantalum by a suitable choice of sputtering conditions favorable to the formation through pseudo-morphic growth of the body centered cubic phase of either yttrium or zirconium. It should be obvious to one skilled in the art that the pseudo-morphic stabilization of other metastable body centered cubic phases is possible for other rare earth elements contemplated as possible getter layers, viz. cerium (Ce), praseodymium (Pr), neodymium (Nd), gadolinium (Gd), and ytterbium (Yb), which are all known to have high temperature allotropes in the body centered cubic phase. Furthermore, stabilization of a metastable body centered cubic phase in the rare earths, scandium (Sc), lanthanum (La), samarium (Sm), terbium (Tb), dysprosium (Dy), holmium (Ho), and erbium (Er) is possible.

Figure 12:
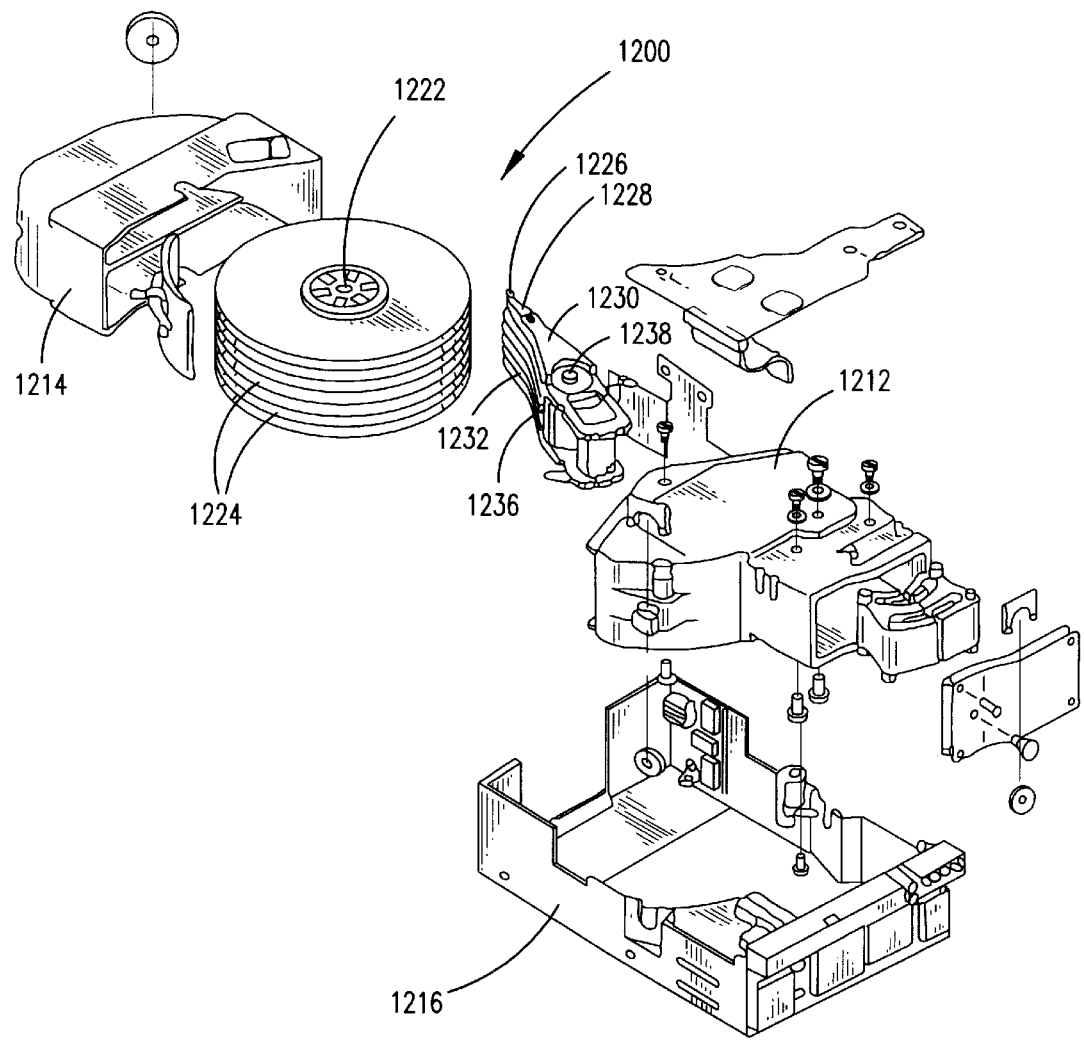
FIG. 12 is an exploded view of a disk drive which utilizes the tantalum thin film leads having getter layer as taught by the present invention.

FIG. 12 is an exploded view of a disk drive 1200 having a read/write head that utilizes the getter layer leads as taught by the present invention. The disk drive 1200 includes a housing 1212 and a housing cover 1214 which, after assembly, is mounted within a frame 1216. Mounted within the housing is a spindle shaft 1222. Rotatably attached to the spindle shaft 1222 are a number of disks 1224. In FIG. 12, eight disks 1224 are attached to the spindle shaft 1222 in spaced apart relation. The disks 1224 rotate on spindle shaft 1222 which is powered by a motor (not shown). Information is written on or read from the disks 1224 by heads or magnetic transducers (not shown) which are supported by sliders 1226. Sliders are coupled to the suspensions or load springs 1228. Preferably, leads according to the invention may be used to provide signal paths to and from a magnetic transducer (not shown) coupled to the slider 1226. Further, the sensor structure may be formed according the present invention. The load springs 1228 are attached to separate arms 1230 on an E block or comb 1232. The E block or comb 1232 is attached at one end of an actuator arm assembly 1236. The actuator arm assembly 1236 is rotatably attached within the housing 1212 on an actuator shaft 1238. However, those skilled in the art will recognize that application of the teachings of the present invention are not meant to be limited to the disk drive described above.

Further, for the getter layer to work for a slider, it may not be necessary to bring it all the way out to the air bearing slider, but to leave it with a "stitch" structure somewhat removed from the air bearing surface buried deeper in the head.

In summary, the getter layer has been shown to remedy the resistance increase phenomenon problem in the tantalum lead. However, there are other places where tantalum (Ta) thin film leads are used in the head, such as the sensor structure. The use of getter layers in the vicinity of the sensor, if not in the sensor itself, may provide benefits to the sensor. Other body centered cubic metals may also be used as lead materials, e.g. tungsten. These are also subject in greater or lesser degree to the effects of the resistance increase phenomenon, and would benefit from the use of the getter layer. Hydrogen has been shown to contribute to the resistance increase phenomenon in the lead. However, there are other materials in the head, such as alumina spacers and insulators, and the file, more generally, that may be adversely affected by mobile hydrogen impurities. Accordingly, the getter layer may be useful in trapping hydrogen and other deleterious impurities from these materials.

There are several advantages of this approach for solving the resistance increase phenomenon problem. Unlike alloying with getter constituents, it does not increase the resistance of the lead when used as a capping layer. The getter layer can capture even highly mobile impurities, such as hydrogen, which previous solutions to the resistance increase phenomenon problem have not addressed. Since it captures hydrogen, it can serve to protect the lead from the potential problems of embrittlement and concomitant delaminations. Approaches based on controlling the microstructure of the lead, such as plugging grain boundaries, reducing their number, or reducing the number of defect sites for the capture of impurities within the lead, are less effective in eliminating the effects of the impurities because these sites of impurity adsorption can never be entirely eliminated from the lead. The getter layer approach does not suffer from the limitations of attempting to control the microstructure of the lead and works independent of the lead microstructure. In addition, the deleterious effects of some impurities, e.g. hydrogen, may operate independently of the thin film microstructure.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magneto-resistive head having a thin film lead structure, the thin film lead structure being resistant to contamination by mobile impurities, comprising:

a magneto-resistive sensor;

a thin film lead, coupled to the magneto-resistive sensor, for providing an electrical conductance path to and from the magneto-resistive sensor; and a getter layer material, disposed proximate to the thin film lead, having a higher affinity for mobile impurities than the thin film lead, the getter layer material capturing mobile impurities and preventing the migration of the mobile impurities into the thin film lead, wherein the getter layer material is encapsulated within the thin film lead.

2. The magneto-resistive head of claim 1 wherein the getter layer material is formed over and in contact with the thin film lead.

3. The magneto-resistive head of claim 1 wherein the mobile impurities comprises oxygen, hydrogen, carbon, or nitrogen.

4. The magneto-resistive head of claim 1 wherein the thin film lead comprises tantalum.

5. The magneto-resistive head of claim 1 wherein the thin film lead comprises body centered cubic transition metals, the body centered cubic transition metals selected from the group consisting of tantalum, niobium, vanadium, chromium, molybdenum, tungsten and iron.

6. The magneto-resistive head of claim 1 wherein the thin film lead comprises body centered cubic alloys, the body centered cubic alloys being selected from the group consisting of tantalum, niobium, vanadium, chromium, molybdenum, tungsten and iron alloys.

7. The magneto-resistive head of claim 1 wherein the getter layer comprises a transition metal.

8. The magneto-resistive head of claim 7 wherein the transition metal comprises titanium, zirconium, or hafnium.

9. The magneto-resistive head of claim 1 wherein the getter layer captures mobile impurities at temperatures between 25° C. and 240° C.

10. The magneto-resistive head of claim 1 wherein the capture of mobile impurities by the getter layer prevents resistance increase phenomenon in the thin film lead.

11. The magneto-resistive head of claim 1 wherein the capture of mobile impurities by the getter layer prevents embrittlement of the thin film lead.

12. The magneto-resistive head of claim 1 wherein the getter layer material comprises a multi-layer construction, the multi-layer construction comprising at least a first getter layer formed over and in contact with the thin film lead and at least a second getter layer encapsulated within the thin film lead.

13. The magneto-resistive head of claim 1 wherein the thin film lead comprises a thin film lead to an electrical circuit.

14. The magneto-resistive head of claim 1 wherein the thin film lead comprises a thin film lead formed at an air bearing surface on a slider for a data storage device.

15. The magneto-resistive head of claim 1 wherein the thin film lead comprises a thin film lead buried below an air bearing surface on a slider for a data storage device.

16. A data storage device, comprising:

a recording medium;

an actuator arm assembly;

a slider, attached to the actuator arm assembly proximate to the recording medium such that the slider can be selectively positioned over the surface of the recording medium;

a magneto-resistive sensor assembly, coupled to the slider, for writing and reading data to and from the recording medium; and a thin film lead structure, within the magneto-resistive sensor assembly, for providing a signal path for the data, the thin film lead structure comprising:
a thin film lead; and
a getter layer material, disposed proximate to the thin film lead, having a higher affinity for mobile impurities that the thin film lead, the getter layer material capturing mobile impurities and preventing the migration of the mobile impurities into the thin film lead, wherein the getter layer material is encapsulated within the thin film lead.

17. The data storage device of claim 16 wherein the getter layer material is formed over and in contact with the thin film lead.

18. The data storage device of claim 1 wherein the mobile impurities comprise oxygen, hydrogen, carbon, or nitrogen.

19. The data storage device of claim 16 wherein the thin film lead comprises tantalum.

20. The data storage device of claim 16 wherein the thin film lead comprises body centered cubic transition metals, the body centered cubic transition metals selected from the group consisting of tantalum, niobium, vanadium, chromium, molybdenum, tungsten and iron.

21. The data storage device of claim 16 wherein the thin film lead comprises body centered cubic alloys, the body centered cubic alloys being selected from the group consisting of tantalum, niobium, vanadium, chromium, molybdenum, tungsten and iron alloys.

22. The data storage device of claim 16 wherein the getter layer comprises a transition metal.

23. The data storage device of claim 22 wherein the transition metal comprises titanium, zirconium, or hafnium.

24. The data storage device of claim 16 wherein the getter layer captures mobile impurities at temperatures between 25° C. and 240° C.

25. The data storage device of claim 16 wherein the capture of mobile impurities by the getter layer prevents resistance increase phenomenon in the thin film lead.

26. The data storage device of claim 16 wherein the capture of mobile impurities by the getter layer prevents embrittlement of the thin film lead.

27. The data storage device of claim 16 wherein the getter layer material comprises a multi-layer construction, the multi-layer construction comprising at least a first getter layer formed over and in contact with the thin film lead and at least a second getter layer encapsulated within the thin film lead.

28. The data storage device of claim 16 wherein the thin film lead comprises a thin film lead formed at an air bearing surface on the slider.

29. The data storage device of claim 16 wherein the thin film lead comprises a thin film lead buried below an air bearing surface on the slider.

30. A method of forming a thin film lead structure for a magneto-resistive sensor, wherein the thin film lead structure is resistant to contamination by mobile impurities, comprising the steps of:

fabricating a magneto-resistive sensor;

forming a thin film lead; and forming a getter layer material having a higher affinity for mobile impurities that the thin film lead, the getter layer being proximate to the thin film lead, capturing mobile impurities and preventing the migration of the mobile impurities into the thin film lead, wherein the step of forming the getter layer material further comprises the step of encapsulating the getter layer material within the thin film lead has been inserted after "thin film lead".

31. The method of claim 30 wherein the step of forming the getter layer material further comprises the step of forming the getter layer material over and in contact with the thin film lead.

32. The method of claim 30 wherein the mobile impurities comprises oxygen, hydrogen, carbon, or nitrogen.

33. The method of claim 30 wherein the step of forming the thin film lead further comprises the step of forming the thin film lead using tantalum.

34. The method of claim 30 wherein the step of forming the thin film lead further comprises the step of forming the thin film lead from body centered cubic transition metals, the body centered cubic transition metals selected from the group consisting of tantalum, niobium, vanadium, chromium, molybdenum, tungsten and iron.

35. The method of claim 30 wherein the step of forming the thin film lead further comprises the step of forming the thin film lead from body centered cubic alloys, the body centered cubic alloys being selected from the group consisting of tantalum, niobium, vanadium, chromium, molybdenum, tungsten, and iron alloys.

36. The method of claim 30 wherein the step of forming the getter layer further comprises the step of forming the getter layer from transition metals.

37. The method of claim 36 wherein the transition metal is selected from the group of titanium, zirconium, and hafnium.

38. The method of claim 30 wherein the getter layer captures mobile impurities at temperatures between 25° C. and 240° C.

39. The method of claim 30 wherein the capture of mobile impurities by the getter layer prevents resistance increase phenomenon in the thin film lead.

40. The method of claim 30 wherein the capture of mobile impurities by the getter layer prevents embrittlement of the thin film lead.

41. The method of claim 30 wherein the step of forming the getter layer material further comprises the step of forming a multi-layer construction, the step of forming the multi-layer construction comprises the steps of forming at least a first getter layer formed over and in contact with the thin film lead and forming at least a second getter layer encapsulated within the thin film lead.

42. The method of claim 30 further comprising the step of connecting thin film lead to an electrical circuit.

43. The method of claim 30 wherein the step of forming the thin film lead further comprises forming the thin film lead at an air bearing surface on a slider for a data storage device.

44. The method of claim 30 wherein the step of forming the thin film lead further comprises the step of burying the thin film lead below an air bearing surface on a slider for a data storage device.

45. A magneto-resistive head having a thin film lead structure, the thin film lead structure being resistant to contamination by mobile impurities, comprising:

a magneto-resistive sensor having a magneto-resistive layer in a central sensor region disposed between passive end regions;

a thin film lead, coupled to the magneto-resistive sensor, for providing an electrical conductance path to and from the magneto-resistive sensor; and a getter layer material in contact with the thin film lead, the getter layer having a higher affinity for mobile impurities than the thin film lead, the getter layer material capturing mobile impurities and preventing the migration of the mobile impurities into the thin film lead, wherein the getter layer material is encapsulated within the thin film lead.

46. The magneto-resistive head of claim 45 wherein the getter layer material is formed over and in contact with the thin film lead.

47. The magneto-resistive head of claim 45 wherein the mobile impurities comprises oxygen, hydrogen, carbon, or nitrogen.

48. The magneto-resistive head of claim 45 wherein the thin film lead comprises tantalum.

49. The magneto-resistive head of claim 45 wherein the thin film lead comprises body centered cubic transition metals, the body centered cubic transition metals selected from the group consisting of tantalum, niobium, vanadium, chromium, molybdenum, tungsten and iron.

50. The magneto-resistive head of claim 45 wherein the thin film lead comprises body centered cubic alloys, the body centered cubic alloys being selected from the group consisting of tantalum, niobium, vanadium, chromium, molybdenum, tungsten and iron alloys.

51. The magneto-resistive head of claim 45 wherein the getter layer comprises a transition metal.

52. The magneto-resistive head of claim 51 wherein the transition metal comprises titanium, zirconium, or hafnium.

53. The magneto-resistive head of claim 45 wherein the getter layer captures mobile impurities at temperatures between 25° C. and 240° C.

54. The magneto-resistive head of claim 45 wherein the capture of mobile impurities by the getter layer prevents resistance increase phenomenon in the thin film lead.

55. The magneto-resistive head of claim 45 wherein the capture of mobile impurities by the getter layer prevents embrittlement of the thin film lead.

56. The magneto-resistive head of claim 45 wherein the getter layer material comprises a multi-layer construction, the multi-layer construction comprising at least a first getter layer formed over and in contact with the thin film lead and at least a second getter layer encapsulated within the thin film lead.

57. The magneto-resistive head of claim 45 wherein the thin film lead comprises a thin film lead to an electrical circuit.

58. The magneto-resistive head of claim 45 wherein the thin film lead comprises a thin film lead formed at an air bearing surface on a slider for a data storage device.

59. The magneto-resistive head of claim 45 wherein the thin film lead comprises a thin film lead buried below an air bearing surface on a slider for a data storage device.

* * * * *

UNITED STATES PATENT AND TRADEMARK OFFICE
CERTIFICATE OF CORRECTION

PATENT NO.    : 5,828,532
DATED         : October 27, 1998
INVENTOR(S)   : Ahlert et al.

Page 1 of 1

It is certified that error appears in the above-identified patent and that said Letters Patent is hereby corrected as shown below:

Column 11,
Line 54, replace "claim 1" with -- 16 --.

Column 12,
Lines 39-40, delete "has been inserted" after "thin film lead";

Signed and Sealed this

Third day of September, 2002

Attest:

Attesting Officer

JAMES E. ROGAN
Director of the United States Patent and Trademark Office